United States Patent
Shua et al.

(10) Patent No.: US 9,208,317 B2
(45) Date of Patent: Dec. 8, 2015

(54) SIMULTANEOUS SCREENING OF UNTRUSTED DIGITAL FILES

(71) Applicants: Avi Shua, Tel Aviv (IL); Hen Amar, Holon (IL); John Basilia, Haifa (IL)

(72) Inventors: Avi Shua, Tel Aviv (IL); Hen Amar, Holon (IL); John Basilia, Haifa (IL)

(73) Assignee: CHECK POINT SOFTWARE TECHNOLOGIES LTD., Tel-Aviv (IL)

( * ) Notice: Subject to any disclaimer, the term of this patent is extended or adjusted under 35 U.S.C. 154(b) by 46 days.

(21) Appl. No.: 13/769,331

(22) Filed: Feb. 17, 2013

(65) Prior Publication Data

US 2014/0237590 A1 Aug. 21, 2014

(51) Int. Cl.
*G06F 21/56* (2013.01)
*G06F 21/53* (2013.01)

(52) U.S. Cl.
CPC .............. *G06F 21/566* (2013.01); *G06F 21/53* (2013.01)

(58) Field of Classification Search
None
See application file for complete search history.

(56) References Cited

U.S. PATENT DOCUMENTS

| | | | | |
|---|---|---|---|---|
| 7,908,653 | B2 * | 3/2011 | Brickell et al. | 726/22 |
| 2006/0161982 | A1 * | 7/2006 | Chari et al. | 726/23 |
| 2012/0174224 | A1 * | 7/2012 | Thomas et al. | 726/24 |
| 2013/0145463 | A1 * | 6/2013 | Ghosh et al. | 726/22 |
| 2013/0273879 | A1 * | 10/2013 | Eisen et al. | 455/405 |
| 2014/0006598 | A1 * | 1/2014 | Uola | 709/224 |
| 2014/0215617 | A1 * | 7/2014 | Smith et al. | 726/23 |

OTHER PUBLICATIONS

Seifert, Christian, Ian Welch, Peter Komisarczuk, Application of divide-and-conquer algorithm paradigm to improve the detection speed of high interaction client honeypots, Mar. 16-20, 2008, ACM, SAC' 08.*

* cited by examiner

*Primary Examiner* — Minh Dinh
*Assistant Examiner* — Wayne An
(74) *Attorney, Agent, or Firm* — Mark M. Friedman

(57) ABSTRACT

A plurality of untrusted digital files are run simultaneously in fewer sandboxes than there are files, while monitoring for malicious activity. Preferably, only one sandbox is used. If the monitoring detects malicious activity, either the files are run again in individual sandboxes, or the files are divided among subsets whose files are run simultaneously in one or more sandboxes, while monitoring for malicious activity.

12 Claims, 2 Drawing Sheets

SIMULTANEOUS SCREENING OF UNTRUSTED DIGITAL FILES

FIELD AND BACKGROUND OF THE INVENTION

The present invention relates to computer security and, more particularly, to an efficient method of screening untrusted digital files.

Malware is software used or created by attackers to disrupt computer operation, gather sensitive information, or gain access to private computer systems. Malware typically is distributed by being embedded in innocent looking digital files. These files can be either executable files, such as object files and scripts, or nominally non-executable files, for example word processing documents.

One known method to test an untrusted digital file for the presence of embedded malware is to run the file in a secure virtual environment. In the present context, "running" a file means doing to the file what a user normally would do to use the file. In the case of a nominally executable file, "running" the file means executing the file. In the case of a nominally non-executable file, "running" the file means opening the file using the appropriate application. For example, "running" a Microsoft Word™ file means opening the file using Microsoft Word™ and "running" a .pdf file means opening the file using Adobe Acrobat™ or Adobe Acrobat Reader™. The secure virtual environment that is used for this purpose is commonly called a "sandbox". A sandbox provides a tightly controlled set of resources, such as scratch space in a hard disk, for running untrusted digital files. Network access, the ability to inspect the host system and the ability to read from input devices is either disallowed or heavily restricted.

As an untrusted digital file is being run in a sandbox session, the sandbox code monitors the session for attempted malicious activity. Examples of such malicious activity include unexpected process creation, unexpected process termination, unexpected setting or deletion of registry entries, unexpected reading and/or writing of files, and unexpected network activity such as opening TCP/UDP; connections, HTTP requests and DNS queries. A file that runs without attempting anything malicious is considered trustworthy or benign. A file that attempts malicious activity is therefore known to have malicious code embedded therein. The usual way to monitor a session for attempted malicious activity is to log selected activity of the session and to inspect the log after the session for attempted malicious activity. The following table is an example of a small portion of one such log for a Microsoft Windows™ operating system:

| Activity Type | Path | Origin Process | Activity |
|---|---|---|---|
| process | C:\Windows\System32\services.exe | C:\Windows\System32\sppsvc.exe | created |
| file system | C\Windows\System32\tmp.txt | C:\Windows\System32\svchost.exe | created |
| registry | Services\TCPIP\Linkage\Bind | C:\WINDOWS\explorer.exe | created |

Conventionally, the untrusted digital file is allowed to run to completion, even after malicious activity has been detected, for two reasons. First, it is conventional wisdom that a system administrator should be given a complete report of attempted malicious activity. Second, a complete log provides clues to new malware patterns.

Conventionally, untrusted files are tested individually in this manner. The throughput of such testing of untrusted files can be improved by running several sandboxes simultaneously, but this may be expensive in terms of the system resources, especially memory, that need to be devoted to such testing.

SUMMARY OF THE INVENTION

According to the present invention there is provided a computer security method including: (a) simultaneously running a plurality of untrusted digital files in at least one sandbox; and (b) monitoring the running of the digital files for malicious activity; wherein a number of the sandboxes is smaller than a number of the untrusted digital files.

According to the present invention there is provided a computer readable storage medium having computer readable code embodied on the computer readable storage medium, the computer readable code for implementing computer security, the computer readable code including: (a) program code for simultaneously running a plurality of untrusted digital tiles in at least one sandbox; and (b) program code for monitoring the running of the digital files for malicious activity; wherein a number of the sandboxes is smaller than a number of the umrusted digital files.

According to the basic method of the present invention, two or more untrusted digital files are run simultaneously in one or more sandboxes. Normally, only a single sandbox is used, but in any case the number of sandboxes is less than the number of untrusted digital files. The running of the files is monitored for malicious activity such as process creation, process termination, setting of registry entries, deletion of registry entries, reading of files, writing of files and network activity.

In some embodiments, if the monitoring detects malicious activity, then each untrusted digital file is run separately in its own sandbox and monitored separately for malicious activity.

In other embodiments, if the monitoring detects malicious activity the untrusted digital files are divided among two or more subsets. Preferably, at least one of the subsets includes two or more files. The file(s) of each subset is/are run in a sandbox, with the running being monitored for malicious activity. If a subset has more than one file, those files are run simultaneously. If running one of the multi-file subsets results in malicious activity then that subset is split into further subsets and the process is iterated.

Preferably, in these other embodiments, the untrusted digital files are divided between exactly two subsets. Most preferably, the two subsets include equal numbers of files (e.g. if the original set included an even number of files) or nearly equal numbers of files (e.g. if the original set included an odd number of files).

Preferably, in these other embodiments, the number of files in the original set is an integral power of 2 and the dividing is between two subsets, each with half the original number of files.

Preferably, during the monitoring, one or more details of the running, such as an identifier of a parent process of a process that attempts malicious activity, are recorded. If the monitoring detects malicious activity, the set of untrusted digital files is pruned according to the detail(s) that are associated with the malicious activity. For example, if a detail provides a clue as to which file(s) caused the malicious activity, those files are marked as malicious and are not inspected further. As another example, if a detail provides a clue as to which file(s) did not cause the malicious activity, those files are marked as benign and are not inspected further.

The scope of the claims also includes a computer readable storage medium having embedded thereon computer readable code for implementing the method of the present invention.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Figure 1:
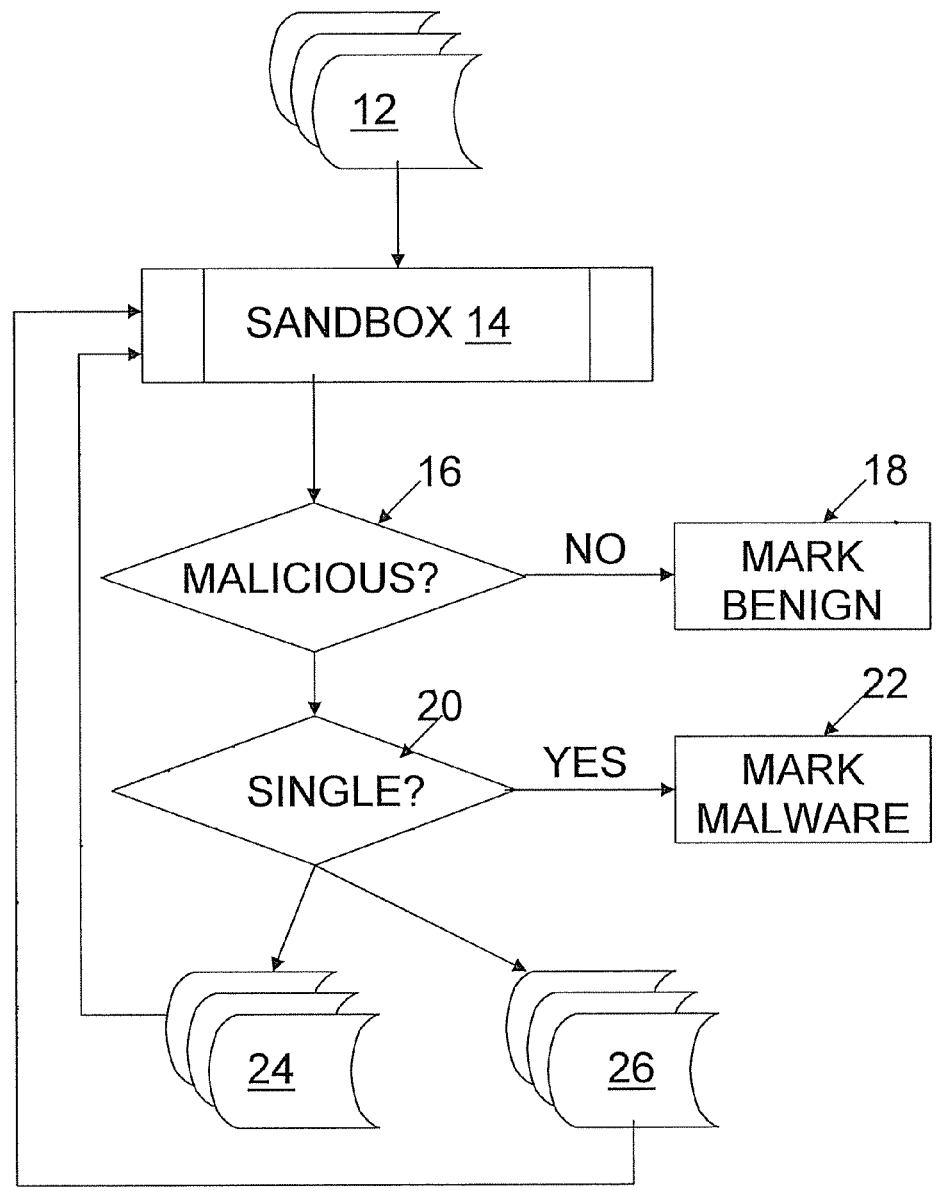
FIG. 1 is a flow chart that illustrates the general concept of the present invention.

The principles and operation of computer security according to the present invention may be better understood with reference to the drawings and the accompanying description.

The general concept of the present invention is to run several untrusted digital files simultaneously in one sandbox. Because the overwhelming majority of untrusted files in fact do not contain malware, almost all such sessions end with no malicious activity detected, and the files are designated as trusted or benign. As soon as malicious activity is detected, the set of files being inspected is divided into two or more subsets and the subsets are inspected individually. This process is iterated until the file or files that contain malware have been identified and marked as malicious. At this point, the file(s) that contain malware may be inspected again in the conventional manner, to provide a complete report of attempted malicious activity and to provide clues to new malware patterns.

Other things being equal, the most efficient way to implement this method is to start with a number of untrusted files that is equal to a power of 2. If malicious activity is detected in a set of $2^n$ files, where n>0, the set is divided in two and the two subsets are tested individually. This procedure is iterated until the file or files that contain malware are identified and are marked as malicious.

If some of the files of a set of untrusted files are known a priori to make more intensive use of system resources than the other untrusted files, it may be more efficient, upon detecting malicious activity, to divide the set into two subsets with unequal numbers of files for further inspection, or even into three or more subsets.

If latency is an issue, then, after the initial collective inspection of the set of untrusted files, each file of a subset is run in its own respective sandbox.

A session of simultaneously running several files may be terminated as soon as malicious activity is detected (which indicates that at least one of the files contains malware), or may be allowed to run to completion in the conventional manner, followed by log inspection. Whether or not the session is allowed to run to completion, the log may provide a clue as to which file is the malicious file. For example, if the sandbox operating system is a Microsoft Windows™ operating system then the process ID of the parent of the process that attempted malicious activity may indicate which file is most likely to be the malicious file. That file then is inspected separately. Under some favorable circumstances, the process ID of the parent process indicates with certainty which file is the malicious file, so that the simultaneous run may be terminated upon the appearance of such attempted malicious activity in the log and the identification of the responsible file (and it is the unpredictability of such circumstances that mandates the iterative nature of the present invention); but allowing the run to run to completion provides further clues about new malware, as described above. Alternatively or additionally, the clue is used to identify files that were inspected in the session that could not have produced the logged malicious activity, and these files are marked as trusted and are not subjected to further inspection.

Referring now to the drawings, FIG. 1 is a flow chart that illustrates the general concept of the present invention. A set 12 of one or more untrusted digital files is inspected in a sandbox 14. If (decision block 16) the sandbox session detected no attempted malicious activity, all the files are marked as benign in block 18. If (decision block 16) the sandbox session detected attempted malicious activity, then (decision block 20) if set 12 includes only one file then that file is marked as malware in block 22. Otherwise, set 12 is split into two subsets 24 and 26 and the process is repeated separately for each subset.

Figure 2:
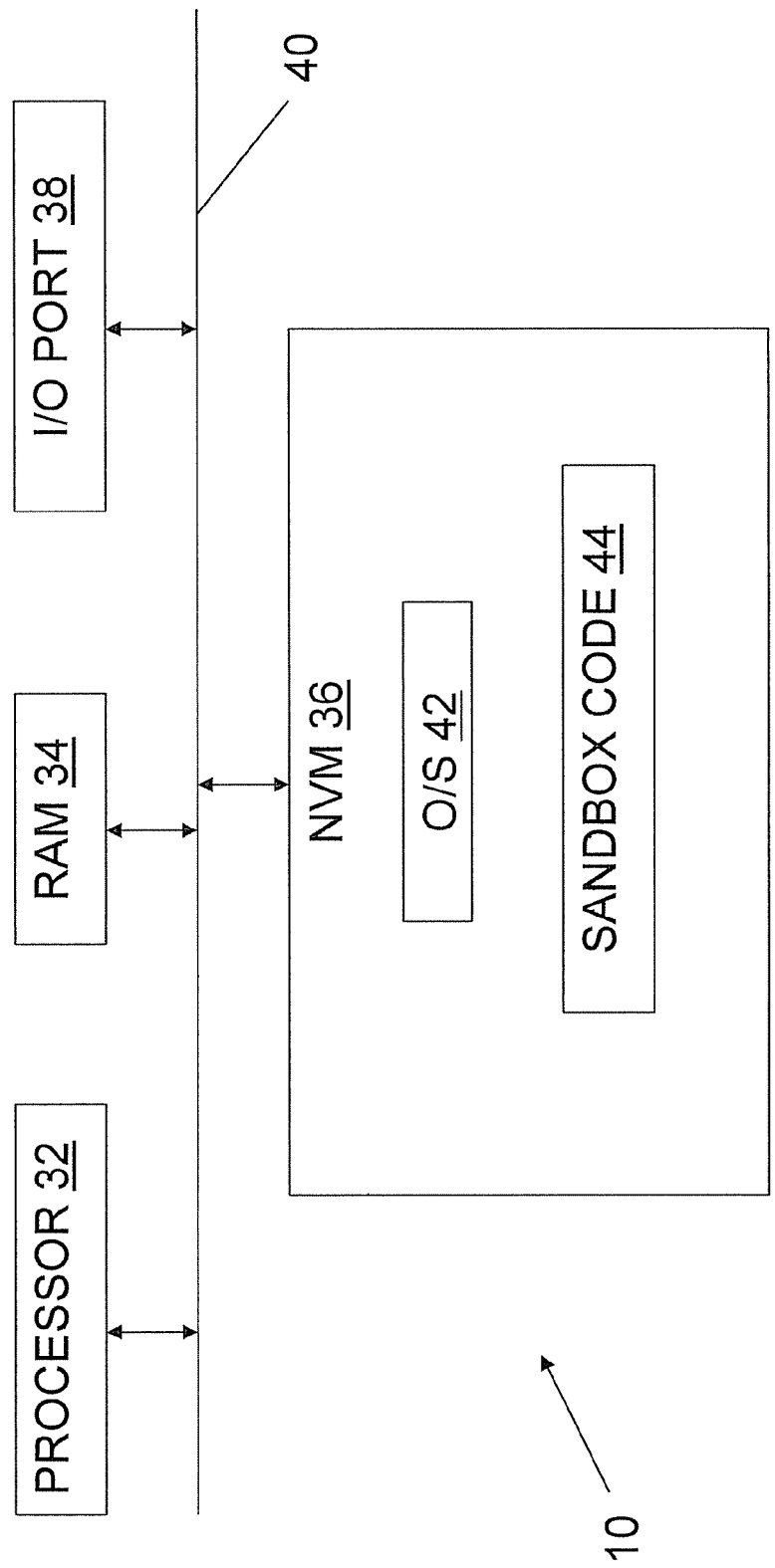
FIG. 2 is a high-level partial block diagram of a computer system configured to implement the present invention.

FIG. 2 is a high-level partial block diagram of an exemplary computer system 30 configured to implement the present invention. Only components of system 30 that are germane to the present invention are shown in FIG. 2. Computer system 30 includes a processor 32, a random access memory (RAM) 34, a non-volatile memory (NVM) 36 and an input/output (I/O) port 38, all communicating with each other via a common bus 40. In NVM 36 are stored operating system (O/S) code 42 and sandbox code 44 of the present invention. Sandbox code 44 is conventional sandbox code modified to inspect several untrusted digital files simultaneously according to the principles of the present invention. Under the control of OS 42, processor 32 loads sandbox code 44 from NVM 36 into RAM 34 and executes sandbox code 44 in RAM 34 to inspect sets of untrusted digital files that are received at I/O port 38. As described above, the execution of sandbox code 44 sets up one or more sandboxes within system 30 for the simultaneous inspection of the files of each set. Files that pass inspection are marked benign and are stored in NVM 36 and/or exported via I/O port 38. Files that fail inspection are deleted.

One aspect of sandboxes that should be emphasized is that a sandbox running on a host computer sets up an entire virtual computer, including a virtual operating system, virtual random access memory, virtual input and output, etc. for running untrusted digital files. So, for example, a sandbox running on a host computer with a Linux™ operating system could set up and run a virtual computer whose operating system is Microsoft Windows™. Code 44 that runs several untrusted digital files simultaneously directly under O/S 42 would not be sandbox code of the present invention but instead would be more like code that runs the untrusted digital files simultaneously in separate individual respective sandboxes.

NVM 36 is an example of a computer-readable storage medium bearing computer-readable code for implementing the data validation methodology described herein. Other examples of such computer-readable storage media include read-only memories such as CDs bearing such code.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A computer security method comprising:
   (a) inserting each of a plurality of untrusted digital files into at least one sandbox, wherein a number of said at least one sandbox is smaller than a number of said untrusted digital files;
   (b) simultaneously running said untrusted digital files in said at least one sandbox;
   (c) monitoring said running of said untrusted digital files for malicious activity; and
   (d) for each of said at least one sandbox, if said monitoring detects said malicious activity then:
      (i) dividing said untrusted digital files among a plurality of subsets;
      (ii) for each of said subsets, repeating running of each said untrusted digital file, in a respective sandbox; and
      (iii) monitoring said repeating running in each respective sandbox for malicious activity.

2. The method of claim 1, wherein said malicious activity is selected from the group consisting of process creation, process termination, setting of registry entries, deletion of registry entries, reading of files, writing of files and network activity.

3. The method of claim 1, wherein said plurality of untrusted files is inserted into and run simultaneously in a single said sandbox.

4. The method of claim 1, further comprising:
   (e) if said monitoring detects said malicious activity:
      (i) for each said subset:
         (A) if said each subset includes at least two said untrusted digital files:
            (I) simultaneously running said at least two untrusted digital files in a sandbox, and
            (II) monitoring said running of said at least two untrusted digital tiles for malicious activity, and
         (B) if said each subset includes only one said untrusted digital file:
            (I) running said only one untrusted digital file in a sandbox, and
            (II) monitoring said running of said only one untrusted digital file for malicious activity.

5. The method of claim 4, wherein at least one said subset includes at least two said digital files.

6. The method of claim 4, further comprising:
   (f) for one of said subsets that includes at least two said untrusted digital files: if said monitoring of said running of said at least two untrusted digital files detects said malicious activity: iterating step (e) on said one subset.

7. The method of claim 4, wherein said untrusted digital files are divided between exactly two said subsets.

8. The method of claim 7, wherein said two subsets include substantially equal numbers of said untrusted digital files.

9. The method of claim 4, wherein said plurality of untrusted digital files includes a number of said untrusted digital files that is an integral power of 2 and wherein said dividing divides said untrusted digital files between two subsets that are equal in number.

10. The method of claim 1, further comprising:
    (e) during said monitoring, recording at least one detail of said running; and
    (f) if said monitoring detects said malicious activity and the at least one detail is associated with said malicious activity: pruning said plurality of untrusted digital files according to said one detail.

11. The method of claim 10, wherein said at least one detail includes an identifier of a parent process of a process that attempts said malicious activity.

12. A non-transitory computer readable storage medium having computer readable code embodied on the computer readable storage medium, the computer readable code for implementing computer security, the computer readable code comprising program code for:
    (a) inserting each of a plurality of untrusted digital tiles into at least one sandbox, wherein a number of said at least one sandbox is smaller than a number of said untrusted digital files;
    (b) simultaneously running said untrusted digital files in said at least one sandbox;
    (c) monitoring said running of said untrusted digital files for malicious activity; and
    (d) for each of said at least one sandbox, if said monitoring detects said malicious activity then:
       (i) dividing said untrusted digital files among a plurality of subsets;
       (ii) for each of said subsets, repeating running of each said untrusted digital file, in a respective sandbox; and
       (iii) monitoring said repeating running in each respective sandbox for malicious activity.

* * * * *